United States Patent
Gutierrez

(10) Patent No.: US 12,392,350 B1
(45) Date of Patent: Aug. 19, 2025

(54) PERSONAL TRACKING FAN

(71) Applicant: Frank Gutierrez, Naples, FL (US)

(72) Inventor: Frank Gutierrez, Naples, FL (US)

(*) Notice: Subject to any disclaimer, the term of this patent is extended or adjusted under 35 U.S.C. 154(b) by 557 days.

(21) Appl. No.: 17/740,418

(22) Filed: May 10, 2022

(51) Int. Cl.
| F04D 25/10 | (2006.01) |
| F04D 19/00 | (2006.01) |
| F24F 11/56 | (2018.01) |
| F24F 120/12 | (2018.01) |
| H04W 4/029 | (2018.01) |
| H04W 4/80 | (2018.01) |

(52) U.S. Cl.
CPC ......... F04D 25/105 (2013.01); F04D 19/002 (2013.01); F24F 11/56 (2018.01); H04W 4/029 (2018.02); H04W 4/80 (2018.02); *F24F 2120/12* (2018.01); *F24F 2221/38* (2013.01); *F24F 2221/42* (2013.01)

(58) Field of Classification Search
CPC ...... F04D 25/105; F04D 19/002; F24F 11/56; F24F 2120/12; F24F 2221/38; F24F 2221/42; H04W 4/029; H04W 4/80
USPC ....................................................... 454/229
See application file for complete search history.

(56) References Cited

U.S. PATENT DOCUMENTS

| 3,385,036 | A | * | 5/1968 | Webb | .......................... F24F 9/00 55/467 |
| 7,228,203 | B2 | | 6/2007 | Koselka | |
| 7,366,588 | B2 | | 4/2008 | Kim | |
| D836,766 | S | | 12/2018 | He | |
| 10,690,372 | B2 | | 6/2020 | Arens | |
| 10,801,750 | B2 | | 10/2020 | Redermacher | |
| 10,989,209 | B2 | | 4/2021 | Xing | |
| 2017/0248970 | A1 | | 8/2017 | Karabed | |
| 2019/0010948 | A1 | * | 1/2019 | Qian | ........................ F04D 27/00 |
| 2022/0136515 | A1 | * | 5/2022 | Oelke | ........................ G06T 7/20 700/276 |
| 2022/0357062 | A1 | * | 11/2022 | Beggs | ................... F24F 11/0001 |
| 2023/0032935 | A1 | * | 2/2023 | Bi | ............................ F24F 11/33 |
| 2023/0291826 | A1 | * | 9/2023 | Xu | ........................ G06F 1/1698 |
| 2024/0263823 | A1 | * | 8/2024 | Tsujimura | ................ F24F 11/52 |

* cited by examiner

*Primary Examiner* — Steven B McAllister
*Assistant Examiner* — Charles R Brawner
(74) *Attorney, Agent, or Firm* — Kyle A. Fletcher, Esq.

(57) ABSTRACT

The personal tracking fan is a fan that is adapted for use with a client. The personal tracking fan is a robot. The personal tracking fan tracks the location of the client. The personal tracking fan adjusts the direction of the air flow such that the air flow is always directed at the client. The personal tracking fan incorporates a fan module, a control circuit, and a personal data device. The control circuit mounts on the fan module. The personal data device establishes a wireless communication link with the control circuit. The fan module generates the air flow. The personal data device is carried by the client. The personal data device transmits the position of the client to the control circuit. The control circuit adjusts the altitude and the azimuth angles of the air flow that are necessary to direct the air flow towards the personal data device.

9 Claims, 6 Drawing Sheets

PERSONAL TRACKING FAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of control systems characterized by their outputs. (F24F11/79)

Summary of Invention

The personal tracking fan is a fan. The personal tracking fan is adapted for use with a client. The personal tracking fan generates an air flow that cools the client. The personal tracking fan is a robot. The personal tracking fan tracks the location of the client. The personal tracking fan adjusts the direction of the air flow such that the air flow is always directed at the client.

The personal tracking fan comprises a fan module, a control circuit, and a personal data device. The control circuit mounts on the fan module. The personal data device establishes a wireless communication link with the control circuit. The fan module generates the air flow. The personal data device is carried by the client. The personal data device transmits the position of the client to the control circuit. The control circuit adjusts the altitude and the azimuth angles of the air flow that are necessary to direct the air flow towards the personal data device.

These together with additional objects, features and advantages of the personal tracking fan will be readily apparent to those of ordinary skill in the art upon reading the following detailed description of the presently preferred, but nonetheless illustrative, embodiments when taken in conjunction with the accompanying drawings.

In this respect, before explaining the current embodiments of the personal tracking fan in detail, it is to be understood that the personal tracking fan is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal tracking fan.

It is therefore important that the claims be regarded as including such equivalent construction insofar as they do not depart from the spirit and scope of the personal tracking fan. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
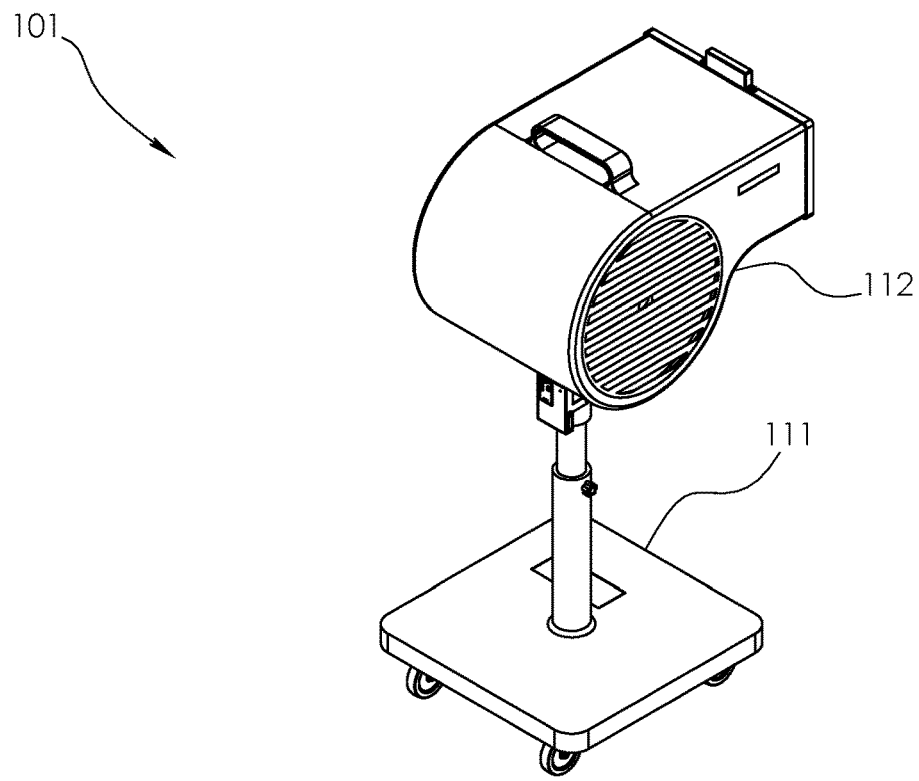
FIG. 1 is a perspective view of an embodiment of the disclosure.
Figure 2:
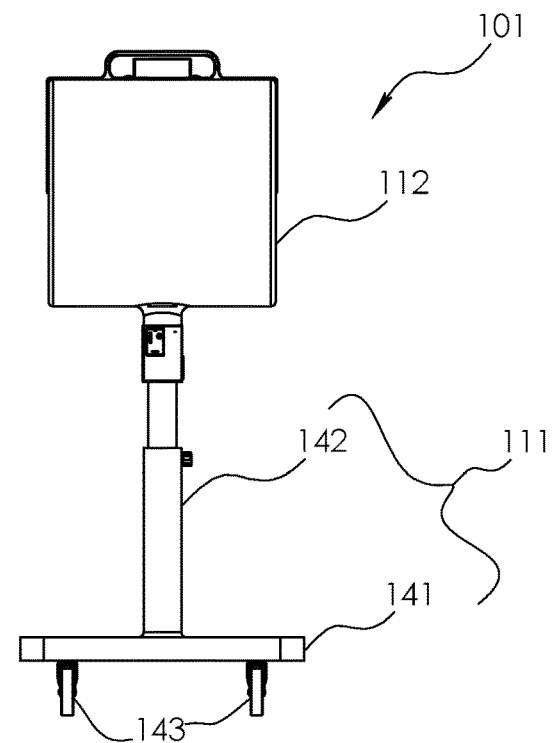
FIG. 2 is a front view of an embodiment of the disclosure.
Figure 3:
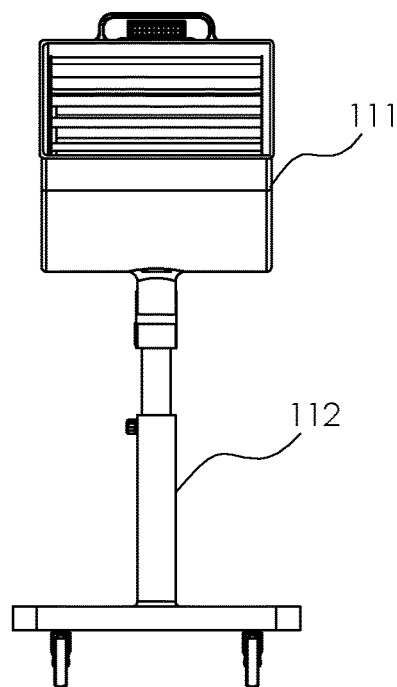
FIG. 3 is a front view of an embodiment of the disclosure.
Figure 4:
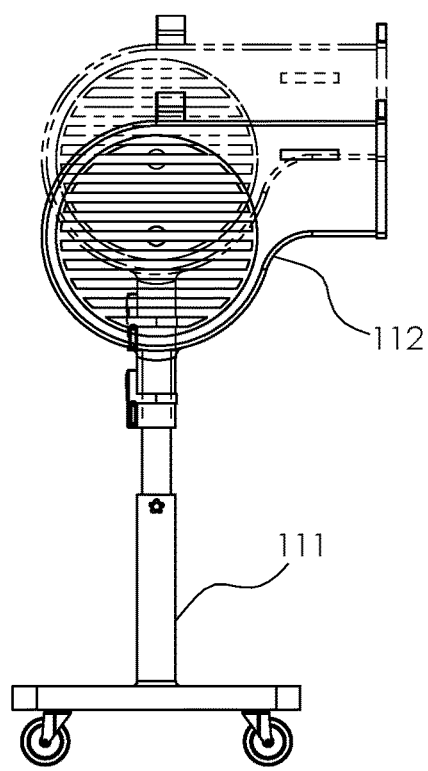
FIG. 4 is a side view of an embodiment of the disclosure.
Figure 5:
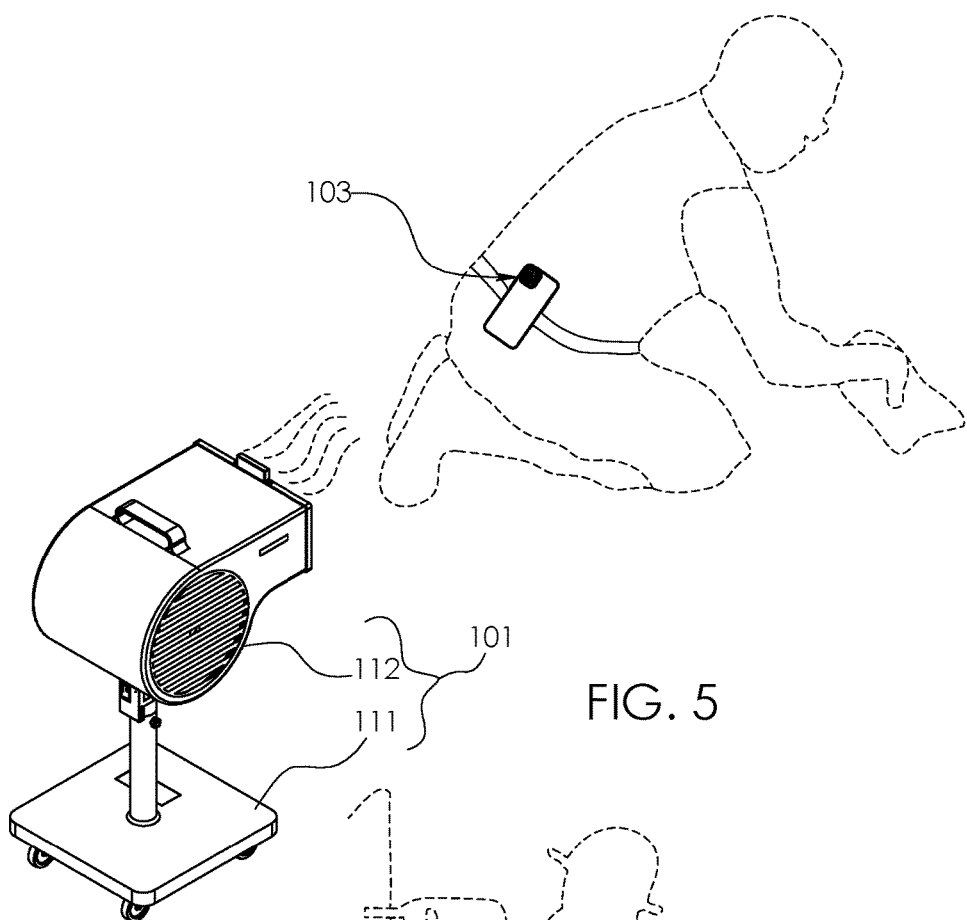
FIG. 5 is an in-use view of an embodiment of the disclosure.
Figure 6:
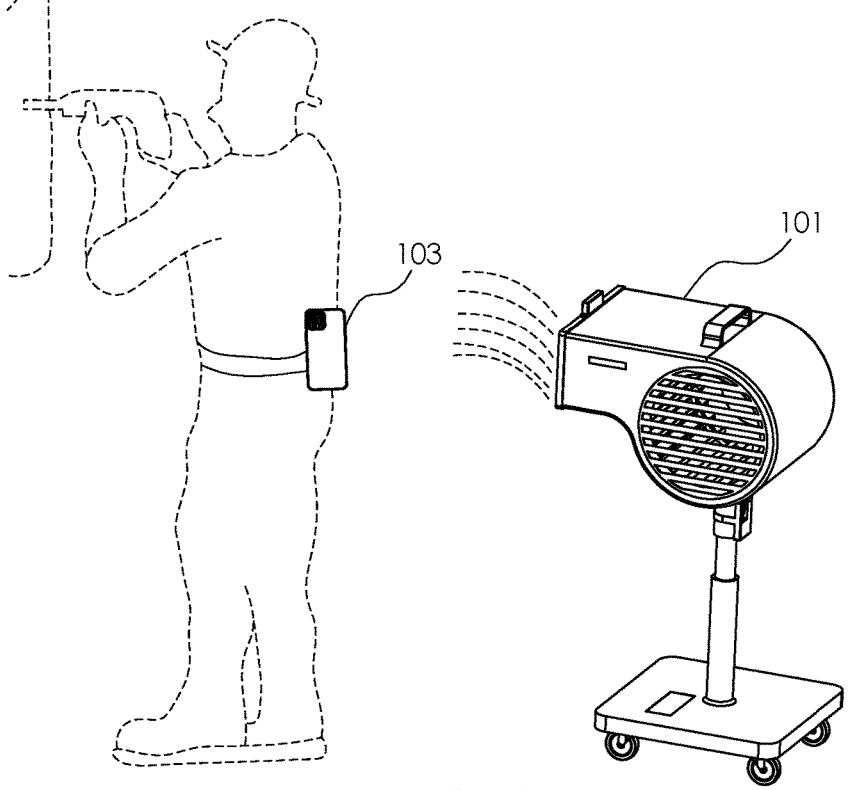
FIG. 6 is an in-use view of an embodiment of the disclosure.
Figure 7:
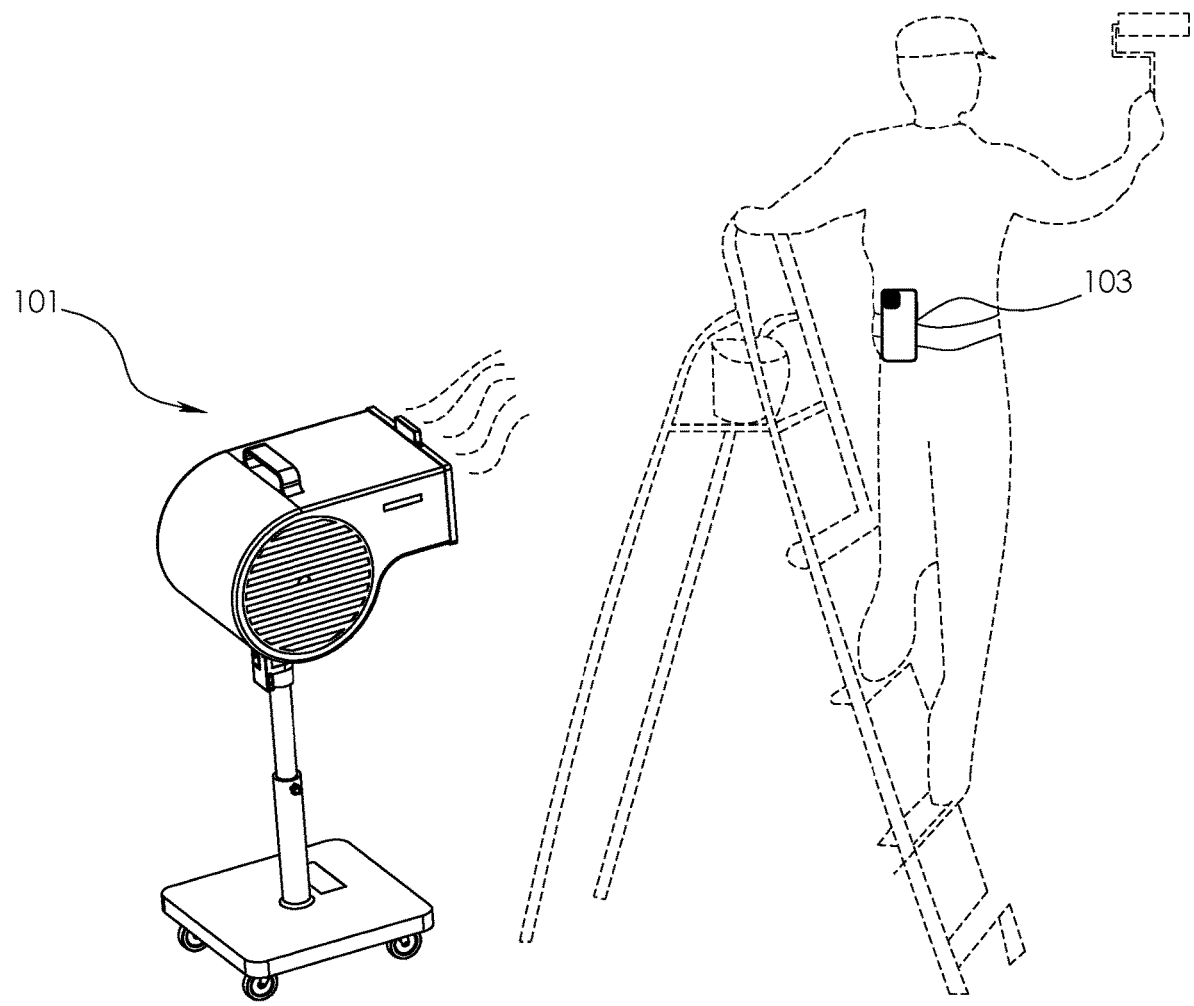
FIG. 7 is an in-use view of an embodiment of the disclosure.
Figure 8:
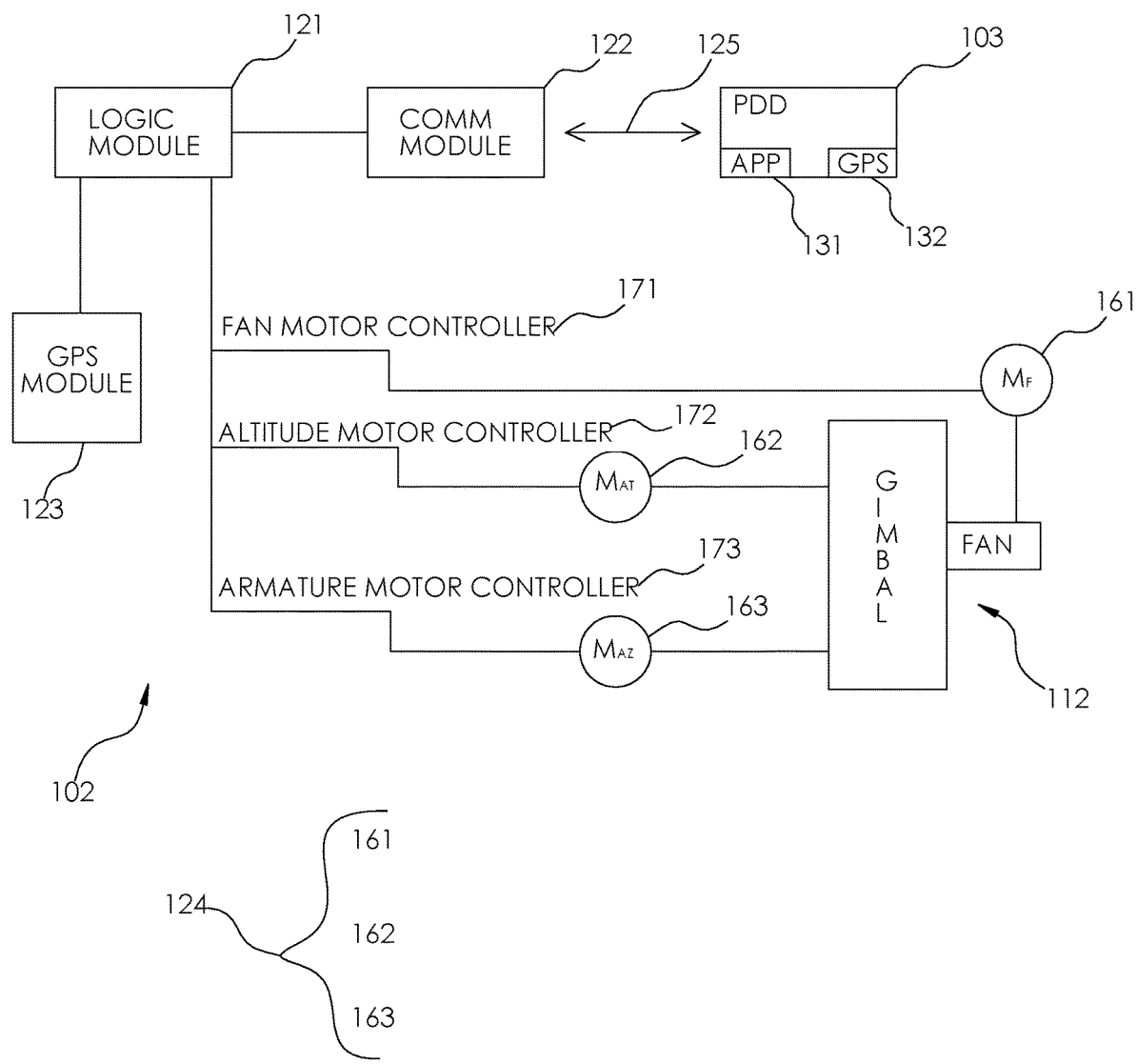
FIG. 8 is a schematic view of an embodiment of the disclosure.
Figure 9:
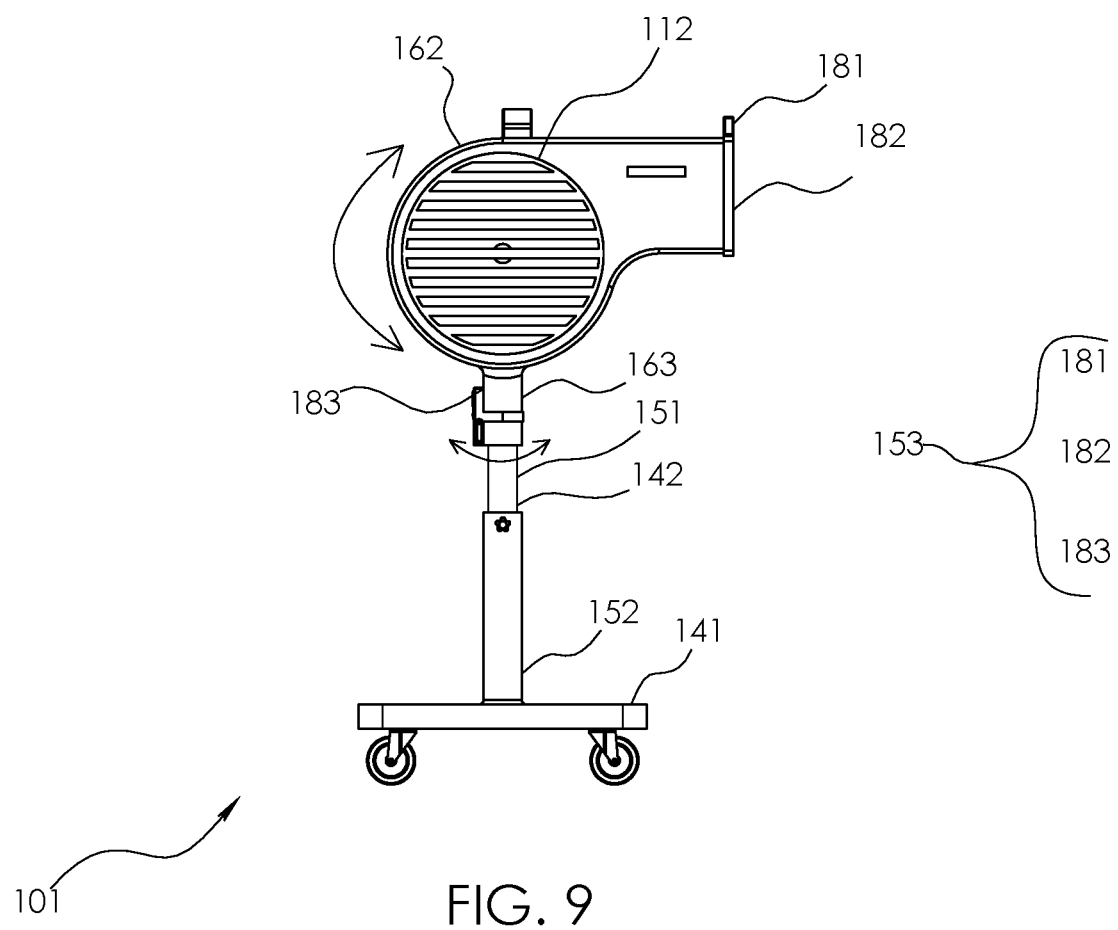
FIG. 9 is a front view of an embodiment of the disclosure.

Detailed reference will now be made to one or more potential embodiments of the disclosure, which are illustrated in FIGS. 1 through 9.

The personal tracking fan 100 (hereinafter invention) is a fan. The invention 100 is adapted for use with a client. The invention 100 generates an air flow that cools the client. The invention 100 is a robot. The invention 100 tracks the location of the client. The invention 100 adjusts the direction of the air flow such that the air flow is always directed at the client.

The invention 100 comprises a fan module 101, a control circuit 102, and a personal data device 103. The control circuit 102 mounts on the fan module 101. The personal data device 103 establishes a wireless communication link 125 with the control circuit 102. The fan module 101 generates the air flow. The personal data device 103 is carried by the client. The personal data device 103 transmits the position of the client to the control circuit 102. The control circuit 102 adjusts the altitude and the azimuth angles of the air flow that are necessary to direct the air flow towards the personal data device 103.

The personal data device 103 is a programmable electrical device. The personal data device 103 further comprises an application 131 and a PDD GPS module 132. The personal data device 103 provides data management and communication services through one or more functions referred to as an application 131. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts. The application 131 of the personal data device 103 forms an interface between the control circuit 102 and a client using the invention 100. The personal data device 103 transmits the GPS coordinates of the personal data device 103 over the wireless communication link 125 to the control circuit 102. The personal data device 103 transmits the volume of air flow desired by the client over the wireless communication link 125 to the control circuit 102. The communication module 122 receives the transmitted operating instructions and relays the received operating instructions to the logic module 121.

The PDD GPS module 132 is an electrical device that communicates with the GPS to determine the GPS coordinates of the PDD GPS module 132. When queried by the application 131, the PDD GPS module 132 transfers the GPS coordinates to the application 131. When queried by the control circuit 102, the personal data device 103 transmits the GPS coordinates to the control circuit 102.

The fan module 101 is a mechanical device. The fan module 101 generates an air flow used to cool the client. The fan module 101 is a rotating structure. The fan module 101 rotates such that the altitude angle of the air flow is adjustable. The fan module 101 rotates such that the azimuth angle of the air flow is adjustable. The fan module 101 comprises a pedestal structure 111 and a fan structure 112.

The fan structure 112 is a mechanical device. The fan structure 112 forms a pump that is used to generate the air flow. The fan structure 112 mounts on the pedestal structure 111 such that the fan structure 112 rotates relative to the pedestal structure 111.

The fan structure 112 mounts on the pedestal structure 111. The pedestal structure 111 is a mechanical structure. The pedestal structure 111 elevates the fan structure 112 above a supporting surface. The pedestal structure 111 is a rotating structure. The rotating structure of the pedestal structure 111 enables the rotation of the fan structure 112 such that the altitude angle and the azimuth angle of the air flow is adjustable by the control circuit 102. The pedestal structure 111 comprises an inferior plate structure 141, a stanchion structure 142, and a plurality of casters 143.

The inferior plate structure 141 is a disk shaped structure. The inferior plate structure 141 is a load bearing structure. The stanchion structure 142 attaches to the surface of the inferior plate structure 141 with the greatest surface area. The plurality of casters 143 attaches to the surface of the inferior plate structure 141 that is distal from the stanchion structure 142. The inferior plate structure 141 transfers the load borne by the stanchion structure 142 to the plurality of casters 143.

Each caster selected from the plurality of casters 143 is a wheeled structure. The caster is defined elsewhere in this disclosure. The plurality of casters 143 forms a wheel structure that allows the fan module 101 to be rolled into its desired operating location.

The stanchion structure 142 is a composite prism structure. The stanchion structure 142 is a telescopic structure. The stanchion structure 142 attaches the fan structure 112 of the inferior plate structure 141. The stanchion structure 142 elevates the fan structure 112 of the inferior plate structure 141. The telescopic nature of the stanchion structure 142 allows the elevation of the fan structure 112 to be adjusted. The fan structure 112 attaches to the stanchion structure 142 such that the fan structure 112 rotates relative to the pedestal structure 111. The stanchion structure 142 comprises a superior congruent end 151, an inferior congruent end 152, and a mounting gimbal 153.

The superior congruent end 151 is a congruent end of the prism structure of the stanchion structure 142. The superior congruent end 151 is the congruent end of the stanchion structure 142 that is distal from the inferior plate structure of the pedestal structure 111. The inferior congruent end 152 is a congruent end of the prism structure of the stanchion structure 142. The inferior congruent end 152 is the congruent end of the stanchion structure 142 that attaches to the superior surface of the inferior plate structure 141. The inferior congruent end 152 is the congruent end of the stanchion structure 142 that is distal from the superior congruent end 151.

The mounting gimbal 153 is a mechanical structure. The mounting gimbal 153 is the rotating structure of the fan module 101. The mounting gimbal 153 secures the fan structure 112 to the stanchion structure 142 such that the fan structure 112 rotates relative to the stanchion structure 142. The mounting gimbal 153 allows the fan structure 112 to rotate in the direction of the altitude motor 162. The mounting gimbal 153 allows the fan structure 112 to rotate in the direction of the azimuth motor 163. The mounting gimbal 153 further comprises a mounting frame 181, an altitude slewing bearing 182, and an azimuth slewing bearing 183.

The mounting frame 181 is a mechanical structure. The mounting frame 181 attaches to the superior congruent end 151 of the stanchion structure 142. The mounting frame 181 transfers the loads of the fan structure 112, the altitude slewing bearing 182, the azimuth slewing bearing 183, and the plurality of motors 124 of the control circuit 102 to the stanchion structure 142.

The altitude slewing bearing 182 is a slewing bearing. The altitude slewing bearing 182 attaches the fan structure 112 to the mounting frame 181 such that the fan structure 112 rotates relative to the mounting frame 181 within the plane of the 11 altitude angle. The altitude motor 162 attaches to the altitude slewing bearing 182 such that the rotation of the altitude motor 162 rotates the fan structure 112.

The azimuth slewing bearing 183 is a slewing bearing. The azimuth slewing bearing 183 attaches the fan structure 112 to the mounting frame 181 such that the fan structure 112 rotates relative to the mounting frame 181 within the plane of the azimuth angle. The azimuth motor 163 attaches to the azimuth slewing bearing 183 such that the rotation of the azimuth motor 163 rotates the fan structure 112.

The control circuit 102 is an electric circuit. The control circuit 102 controls the operation of the fan module 101. By controlling the operation of the fan module 101 is meant that the control circuit 102 controls the volume of air flow generated by the fan module 101. By controlling the operation of the fan module 101 is further meant that the control circuit 102 controls the altitude angle of the air flow generated by the fan module 101. By controlling the operation of the fan module 101 is further meant that the control circuit 102 controls the azimuth angle of the air flow generated by the fan module 101. The control circuit 102 mounts in the fan module 101. The control circuit 102 forms the wireless communication link 125 with the personal data device 103.

The control circuit 102 receives the GPS coordinates of the personal data device 103 from the personal data device 103 over the wireless communication link 125. The control circuit 102 determines the GPS coordinates of the fan module 101. The control circuit 102 calculates the altitude angle and the azimuth angle necessary to aim the air flow generated by the fan module 101 directly at the client.

The control circuit 102 aligns the altitude angle and the azimuth angle of the air flow such that the air flow generated by the fan module 101 is aimed directly at the client. The control circuit 102 controls the volume of air flow generated by the fan module 101. The control circuit 102 receives the desired volume of air flow generated by the fan module 101 from the personal data device 103 over the wireless communication link 125.

The control circuit 102 further adjusts the volume of air flow generated by the fan module 101 to the desired volume.

The control circuit 102 comprises a logic module 121, a communication module 122, a fan GPS module 123, and a plurality of motors 124. The logic module 121, the communication module 122, the fan GPS module 123, and the plurality of motors 124 are electrically interconnected. The communication module 122 further comprises the wireless communication link 125. The wireless communication link 125 establishes the communication link between the control circuit 102 and the personal data device 103.

The logic module 121 is a readily and commercially available programmable electronic device that is used to manage, regulate, and operate the control circuit 102. The communication module 122 is a wireless electronic communication device that allows the logic module 121 to wirelessly communicate with the personal data device 103. Specifically, the communication module 122 establishes a wireless communication link 125 between the control circuit 102 and the personal data device 103. In the first potential embodiment of the disclosure the communication module 122 supports a communication protocol selected from the group consisting of a WiFi™ protocol or a Bluetooth™ protocol.

The fan GPS module 123 is an electrical device that communicates with the GPS to determine the GPS coordinates of the fan GPS module 123. When queried by the logic module 121, the fan GPS module 123 transfers the GPS coordinates to the logic module 121.

Each motor selected from the plurality of motors 124 is an electric motor. Each motor selected from the plurality of motors 124 performs a function of the selected from the group consisting of: a) generating the air flow discharged from the fan module 101; b) setting the altitude angle of the air flow discharged from the fan module 101; and c) setting and maintaining the azimuth angle of the air flow discharged from the fan module 101. Each motor selected from the plurality of motors 124 electrically connects to the logic module 121. The logic module 121 controls the operation of each motor selected from the plurality of motors 124. The plurality of motors 124 further comprises a fan motor 161, an altitude motor 162, and an azimuth motor 163.

The fan motor 161 is an electric motor. The fan motor 161 converts electric energy into rotational energy. The fan motor 161 mechanically attaches to the fan structure 112. The fan structure 112 receives rotational energy from the fan motor 161. The fan motor 161 converts the received rotational energy into the air flow. The fan motor 161 further comprises a fan motor 161 controller 171.

The fan motor 161 controller 171 is a motor controller. The motor controller is defined elsewhere in this disclosure. The fan motor 161 controller 171 electrically connects to the logic module 121. The logic module 121 controls the operation of the fan motor 161 through the fan motor 161 controller 171. The logic module 121 controls the volume of air flow generated by the fan structure 112 through the fan motor 161 controller 171. The fan motor 161 controller 171 controls the speed of rotation of the fan motor 161. The fan motor 161 controller 171 controls the direction of rotation of the fan motor 161.

The altitude motor 162 is an electric motor. The altitude motor 162 is a servo motor. The servo motor is defined elsewhere in this disclosure. The altitude motor 162 converts electric energy into rotational energy. The altitude motor 162 mechanically connects to the altitude slewing bearing 182. The altitude slewing bearing 182 receives rotational energy from the altitude motor 162. The altitude slewing bearing 182 mechanically attaches to the fan structure 112 such that the rotation of the altitude slewing bearing 182 of the altitude motor 162 rotates the fan structure 112. The rotation of the altitude motor 162 changes the altitude angle of the fan structure 112. The altitude motor 162 further comprises an altitude motor 162 controller 172.

The altitude motor 162 controller 172 is a motor controller. The motor controller is defined elsewhere in this disclosure. The altitude motor 162 controller 172 electrically connects to the logic module 121. The logic module 121 controls the operation of the altitude motor 162 through the altitude motor 162 controller 172. The altitude motor 162 controller 172 controls the speed of rotation of the altitude motor 162. The altitude motor 162 controller 172 controls the direction of rotation of the altitude motor 162.

The azimuth motor 163 is an electric motor. The azimuth motor 163 is a servo motor. The servo motor is defined elsewhere in this disclosure. The azimuth motor 163 converts electric energy into rotational energy. The azimuth motor 163 mechanically connects to the azimuth slewing bearing 183. The azimuth slewing bearing 183 receives rotational energy from the azimuth motor 163. The azimuth slewing bearing 183 mechanically attaches to the fan structure 112 such that the rotation of the azimuth slewing bearing 183 of the azimuth motor 163 rotates the fan structure 112. The rotation of the azimuth motor 163 changes the azimuth angle of the fan structure 112. The azimuth motor 163 further comprises an azimuth motor 163 controller 173.

The azimuth motor 163 controller 173 is a motor controller. The motor controller is defined elsewhere in this disclosure. The azimuth motor 163 controller 173 electrically connects to the logic module 121. The logic module 121 controls the operation of the azimuth motor 163 through the azimuth motor 163 controller 173. The azimuth motor 163 controller 173 controls the speed of rotation of the azimuth motor 163. The azimuth motor 163 controller 173 controls the direction of rotation of the azimuth motor 163.

The following definitions were used in this disclosure:

Aim and Target (Objects): As used in this disclosure, the words aim and target are related and are defined together. The word aim means to select the course of the movement of a first object along a path. The target is a second object that lies on the route of the first object such that such that an impact will occur between the first object and the second object.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Altitude: As used in this disclosure, the altitude, or altitude angle, refers to the measurement of an angle between the measurement plane and the azimuth plane.

Angle: As used in this disclosure, an angle is a measure of a region between two intersecting lines or surfaces.

Application or App: As used in this disclosure, an application or app is a self-contained piece of software that is especially designed or downloaded for use with a personal data device.

Arc: As used in this disclosure, an arc refers to a portion of a circumference or a curved perimeter. When applied to an angle or cant, the arc also refers to a measure of an angular span as measured from a circle at the vertex formed by the sides of the angle.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Automatic: As used in this disclosure, automatic refers to a device, process, or a system that operates without human control, supervision or participation in the operation of the device, process, or system. The verb form of automatic is to automate.

Azimuth: As used in this disclosure, the azimuth, or azimuth angle, refers to the measure of the arc between a reference direction and an object in a plane (called the azimuth plane) that is perpendicular to the either the vertical direction or the force of gravity. The compass rose printed on a map is an example of an azimuth angle.

Beacon: As used in this disclosure, a beacon refers to a detectable signal that draws the attention of a person or a device to a location. A beacon is commonly used as a guide to the location or as a warning signal about the location.

Bearing: As used in this disclosure, a bearing is a mechanical device that: 1) guides and limits the motion of a moving component relative to a fixed component; and, 2) reduces the friction between the moving component and the fixed component. A locking bearing is a bearing that can be locked such that the rotation of movements secured into a fixed position until the locking bearing is subsequently unlocked. The use of bearings is well known and documented in the mechanical arts.

Bluetooth™: As used in this disclosure, Bluetooth™ is a standardized communication protocol that is used to wirelessly interconnect electronic devices.

Cant: As used in this disclosure, a cant is an angular deviation from one or more reference lines (or planes) such as a vertical line (or plane) or a horizontal line (or plane).

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first 24 congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Client: As used in this disclosure, a client is an individual who is designated to receive the services of the disclosure at bar.

Communication Link: As used in this disclosure, a communication link refers to the structured exchange of data between two objects.

Composite Prism: As used in this disclosure, a composite prism refers to a structure that is formed from a plurality of structures selected from the group consisting of a prism 17 structure and a pyramid structure. The plurality of selected structures may or may not be truncated. The plurality of prism 19 structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Course: As used in this disclosure, a course refers to the direction, and changes to the direction, that are required to travel from a starting point to a destination point.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fan: As used in this disclosure, a fan is a pump that moves a gas. The first potential embodiment of this disclosure assumes that the fan is a mechanical device with rotating blades that is used to create a flow or current of a gas.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gimbal: As used in this disclosure, a gimbal is a pivoting structure that supports an object in such a manner that the object can be rotated around a single axis of rotation. An object mounted in a first gimbal can be mounted in a second gimbal such that: 1) the first gimbal can be rotated within the second gimbal; and, 2) the object subsequently has a second axis of rotation. Such methods can be repeated in a recursive manner. Designs and methods to mount gimbals in gimbals are well-known and documented in the mechanical arts. Gimbals are often used to keep an object steady in a moving environment.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Impact: As used in this disclosure, an impact refers to an exchange of momentum between two objects over a duration. An impact often refers to a collision between two objects.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Path: As used in this structure, a path is a marked or identified route along which an individual or object can travel. A path is often formed as a track, a road, or a trail.

PDD: As used in this disclosure, PDD is an acronym for personal data device.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Phase: As used in this disclosure, phase refers to the state of the form of matter. The common states of matter are solid, liquid, gas, and plasma.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Robot: As used in this disclosure, a robot is a programmable electronic device that automatically performs a series of predetermined actions.

Rotation: As used in this disclosure, rotation refers to the cyclic movement of an object around a fixed point or fixed axis. The verb of rotation is to rotate.

Route: As used in this disclosure, a route refers to the course that is taken to travel from a starting point to a destination point.

Servo Motor: As used in this disclosure, a servo motor is an electrical motor that further incorporates a feedback circuit that allows for the precise angular positioning of the electric motor.

Slewing Bearing: As used in this disclosure, a slewing bearing is a bearing that is used to rotate an object around an axis of rotation. Slewing bearings are typically load bearing structures.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A personal tracking fan system comprising
a fan module, a control circuit, and a personal data device;
wherein the control circuit mounts on the fan module;
wherein the personal data device establishes a wireless communication link with the control circuit;
wherein the fan module is further defined with a fan that generates the air flow;
wherein the personal tracking fan system is adapted for use with a client;
wherein the personal data device is adapted to be carried by the client such that the personal tracking fan system is configured to track a location of the client;
wherein the personal data device is a programmable electrical device;
wherein the personal data device further comprises an application and a PDD GPS module;
wherein the fan module comprises a pedestal structure and a fan structure;
wherein the pedestal structure comprises an inferior plate structure, a stanchion structure, and a plurality of casters;
wherein the stanchion structure attaches to the surface of the inferior plate structure with a greatest surface area;
wherein the plurality of casters attaches to the surface of the inferior plate structure that is distal from the stanchion structure;
wherein the fan of the personal tracking fan system generates an air flow that is adapted to cool the client;
wherein the personal tracking fan system is configured to adjust the direction of the air flow of the fan such that the air flow is always directed at the client;
wherein the personal data device is adapted to transmit the position of the client to the control circuit;
wherein the control circuit adjusts the altitude angle and the azimuth angle of the air flow;
wherein the personal data device operates the application and the PDD GPS module;
wherein the personal data device transmits the GPS coordinates of the personal data device over the wireless communication link to the control circuit;
wherein the personal data device transmits the volume of air flow desired by the client over the wireless communication link to the control circuit;
wherein the communication module receives the transmitted operating instructions and relays the received operating instructions to the logic module;
wherein the PDD GPS module is an electrical device that communicates with the GPS to determine the GPS coordinates of the PDD GPS module;
wherein the personal data device transmits the GPS coordinates to the control circuit;
wherein the fan module is a mechanical device;
wherein the fan module generates the air flow;
wherein the fan module is a rotating structure;
wherein the fan module rotates such that an altitude angle of the air flow is adjustable;
wherein the fan module rotates such that an azimuth angle of the air flow is adjustable;
wherein the control circuit is an electric circuit;
wherein the control circuit receives the GPS coordinates of the personal data device from the personal data device over the wireless communication link;
wherein the control circuit determines the GPS coordinates of the fan module;
wherein the control circuit calculates the altitude angle and the azimuth angle necessary to aim the air flow generated by the fan module directly at the client;
wherein the control circuit aligns the altitude angle and the azimuth angle of the air flow such that the air flow generated by the fan module is aimed directly at the client;
wherein the control circuit controls the volume of air flow generated by the fan module;
wherein the control circuit receives the desired volume of air flow generated by the fan module from the personal data device over the wireless communication link;
wherein the control circuit further adjusts the volume of air flow generated by the fan module to the desired volume.

2. The personal tracking fan system according to claim 1
wherein the fan structure is a mechanical device;
wherein the fan structure forms a pump that is used to generate the air flow;
wherein the fan structure mounts on the pedestal structure such that the fan structure rotates relative to the pedestal structure;
wherein the fan structure mounts on the pedestal structure;
wherein the pedestal structure is a mechanical structure;
wherein the pedestal structure elevates the fan structure above a supporting surface;
wherein the pedestal structure is a rotating structure;
wherein the rotating structure of the pedestal structure enables the rotation of the fan structure such that the altitude angle and the azimuth angle of the air flow is adjustable by the control circuit.

3. The personal tracking fan system according to claim 2
wherein the control circuit comprises a logic module, a communication module, a fan GPS module, and a plurality of motors;
wherein the logic module, the communication module, the fan GPS module, and the plurality of motors are electrically interconnected;
wherein the communication module further comprises the wireless communication link;
wherein the communication module establishes the communication link between the control circuit and the personal data device.

4. The personal tracking fan system according to claim 3
wherein the inferior plate structure is a disk shaped structure;
wherein the inferior plate structure is a load bearing structure;
wherein the inferior plate structure transfers the load borne by the stanchion structure to the plurality of casters;

wherein each caster selected from the plurality of casters is a wheeled structure;

wherein the plurality of casters forms a wheel structure that allows the fan module to be rolled into its desired operating location;

wherein the stanchion structure attaches the fan structure of the inferior plate structure;

wherein the stanchion structure elevates the fan structure of the inferior plate structure;

wherein the fan structure attaches to the stanchion structure such that the fan structure rotates relative to the pedestal structure.

5. The personal tracking fan system according to claim 4 wherein the stanchion structure comprises a superior congruent end, an inferior congruent end, and a mounting gimbal;

wherein the superior congruent end is a congruent end of the stanchion structure;

wherein the superior congruent end is the congruent end of the stanchion structure that is distal from the inferior plate structure of the pedestal structure;

wherein the inferior congruent end is a congruent end of the stanchion structure;

wherein the inferior congruent end is the congruent end of the stanchion structure that attaches to the superior surface of the inferior plate structure;

wherein the inferior congruent end is the congruent end of the stanchion structure that is distal from the superior congruent end;

wherein the mounting gimbal is a mechanical structure;

wherein the mounting gimbal is the rotating structure of the fan module;

wherein the mounting gimbal secures the fan structure to the stanchion structure such that the fan structure rotates relative to the stanchion structure;

wherein the mounting gimbal allows the fan structure to rotate in the direction of the altitude motor;

wherein the mounting gimbal allows the fan structure to rotate in the direction of the azimuth motor.

6. The personal tracking fan system according to claim 5 wherein the mounting gimbal further comprises a mounting frame, an altitude slewing bearing, and an azimuth slewing bearing;

wherein the mounting frame is a mechanical structure;

wherein the mounting frame attaches to the superior congruent end of the stanchion structure;

wherein the mounting frame transfers the loads of the fan structure, the altitude slewing bearing, the azimuth slewing bearing, and the plurality of motors of the control circuit to the stanchion structure;

wherein the altitude slewing bearing is a slewing bearing;

wherein the altitude slewing bearing attaches the fan structure to the mounting frame such that the fan structure rotates relative to the mounting frame within the plane of the altitude angle;

wherein the altitude motor attaches to the altitude slewing bearing such that the rotation of the altitude motor rotates the fan structure;

wherein the azimuth slewing bearing is a slewing bearing;

wherein the azimuth slewing bearing attaches the fan structure to the mounting frame such that the fan structure rotates relative to the mounting frame within the plane of the azimuth angle;

wherein the azimuth motor attaches to the azimuth slewing bearing such that the rotation of the azimuth motor rotates the fan structure.

7. The personal tracking fan system according to claim 6 wherein the logic module programmable electronic device, wherein the communication module is a wireless electronic communication device that allows the logic module to wirelessly communicate with the personal data device;

wherein the fan GPS module is an electrical device that communicates with the GPS to determine the GPS coordinates of the fan GPS module;

wherein the fan GPS module transfers the GPS coordinates to the logic module;

wherein the logic module calculates the altitude angle and the azimuth angle necessary to aim the air flow generated by the fan module directly at the client;

wherein each motor selected from the plurality of motors is an electric motor;

wherein each motor selected from the plurality of motors performs a function of the selected from the group consisting of: a) generating the air flow discharged from the fan module; b) setting the altitude angle of the air flow discharged from the fan module; and c) setting and maintaining the azimuth angle of the air flow discharged from the fan module;

wherein each motor selected from the plurality of motors electrically connects to the logic module;

wherein the logic module controls the operation of each motor selected from the plurality of motors.

8. The personal tracking fan system according to claim 7 wherein the plurality of motors further comprises a fan motor, an altitude motor, and an azimuth motor;

wherein the fan motor is an electric motor;

wherein the fan motor converts electric energy into rotational energy;

wherein the fan motor mechanically attaches to the fan structure;

wherein the fan structure receives rotational energy from the fan motor;

wherein the fan motor converts the received rotational energy into the air flow;

wherein the altitude motor is an electric motor;

wherein the altitude motor is a servo motor;

wherein the altitude motor converts electric energy into rotational energy;

wherein the altitude motor mechanically connects to the altitude slewing bearing;

wherein the altitude slewing bearing receives rotational energy from the altitude motor;

wherein the altitude slewing bearing mechanically attaches to the fan structure such that the rotation of the altitude slewing bearing of the altitude motor rotates the fan structure;

wherein the rotation of the altitude motor changes the altitude angle of the fan structure;

wherein the azimuth motor is an electric motor;

wherein the azimuth motor is a servo motor;

wherein the azimuth motor converts electric energy into rotational energy;

wherein the azimuth motor mechanically connects to the azimuth slewing bearing;

wherein the azimuth slewing bearing receives rotational energy from the azimuth motor;

wherein the azimuth slewing bearing mechanically attaches to the fan structure such that the rotation of the azimuth slewing bearing of the azimuth motor rotates the fan structure;

wherein the rotation of the azimuth motor changes the azimuth angle of the fan structure.

9. The personal tracking fan system according to claim 8 wherein the fan motor further comprises a fan motor controller;

wherein the altitude motor further comprises an altitude motor controller;

wherein the azimuth motor further comprises an azimuth motor controller;

wherein the fan motor controller is a motor controller;

wherein the fan motor controller electrically connects to the logic module;

wherein the logic module controls the operation of the fan motor through the fan motor controller;

wherein the logic module controls the volume of air flow generated by the fan structure through the fan motor controller;

wherein the fan motor controller controls the speed of rotation of the fan motor;

wherein the fan motor controller controls the direction of rotation of the fan motor;

wherein the altitude motor controller is a motor controller;

wherein the altitude motor controller electrically connects to the logic module;

wherein the logic module controls the operation of the altitude motor through the altitude motor controller;

wherein the altitude motor controller controls the speed of rotation of the altitude motor;

wherein the altitude motor controller controls the direction of rotation of the altitude motor;

wherein the azimuth motor controller is a motor controller;

wherein the azimuth motor controller electrically connects to the logic module;

wherein the logic module controls the operation of the azimuth motor through the azimuth motor controller;

wherein the azimuth motor controller controls the speed of rotation of the azimuth motor;

wherein the azimuth motor controller controls the direction of rotation of the azimuth motor.

* * * * *